United States Patent [19] | [11] 3,855,431
Stewart | [45] Dec. 17, 1974

[54] ELECTRONIC HYBRID AMPLIFIER

[75] Inventor: Alan Stewart, Elk Grove Village, Ill.

[73] Assignee: International Telephone and Telegraph Corporation, New York, N.Y.

[22] Filed: Apr. 2, 1973

[21] Appl. No.: 347,160

[52] U.S. Cl. .......................................... 179/170 NC
[51] Int. Cl. .......................... H04b 3/36, H04m 9/08
[58] Field of Search ...... 179/170 NC, 170.2, 170 T, 179/170.6

[56] References Cited

UNITED STATES PATENTS 3,480,742 11/1969 Gaunt, Jr. .................... 179/170 NC
3,530,260 9/1970 Gaunt, Jr. .................... 179/170 NC

*Primary Examiner*—Kathleen H. Claffy
*Assistant Examiner*—Mitchell Saffian
*Attorney, Agent, or Firm*—James B. Raden; Marvin M. Chaban

[57] ABSTRACT

An improved bidirectional amplifier using the inversion of signals across the output of a transformer having a balanced load is disclosed. The signals for the desired direction are inverted relative to one another by the transformer and fed to the inputs of a difference amplifier. The signals are algebraically summed by the amplifier to comprise an output approximately double that of either input. Reflected signals for the unwanted direction are not balanced and thus are not inverted across the transformer. When these signals are fed to the difference amplifier they are cancelled within the amplifier since there is no difference between the signals.

7 Claims, 4 Drawing Figures

ELECTRONIC HYBRID AMPLIFIER

BACKGROUND OF THE INVENTION

The present invention comprises an improvement over the disclosure of my copending application Ser. No. 149,934 filed June 4, 1971 now abandoned in favor of continuation application Ser. No. 384,107, filed July 30, 1973. In that application, I used the principle of the signal inversion across the secondary of a transformer having a balanced load. Further inverting one of the signals within an inverting amplifier provided additive signal components which were combined in an amplified form. Reflections or unwanted signals were received in an unbalanced condition by the transformer and were not inverted by the transformer. Passing these signals through an inverting amplifier and combining the signal components from the non-inverted path and the inverted path caused cancellation of the unwanted signals. By placing two such amplifier networks back-to-back with single wire outputs from each unidirectional amplifier, a bidirectional two-wire system was evolved.

SUMMARY OF THE INVENTION

The present invention makes use of the principle of the inversion of signals across a balanced transformer. Signals in each transformer secondary output lead are equal and opposite. By feeding these essentially equal and opposite signals into a difference amplifier, they are summed to an output essentially double that of either input. Reflections or unwanted signals are passed through an unbalancing network, so signals passing the transformer secondary are not inverted. By passing these signals through a difference amplifier, they are essentially cancelled.

Using this principle and employing only one difference amplifier in each leg of a two wire network, a directional two-wire hybrid amplifier is constructed.

The amplifier described herein is especially useful in its system where only a limited amount of gain is required. In such systems, the freedom from oscillation is a factor of considerably greater importance than gain. An example of a system of the type referred to is that of a PABX, where the length of lines between stations, is essentially short with comparatively little loss. In these systems, gain is required only to the extent necessary to overcome the minor signal losses caused by the few transformers in a conversation path. In PABX's, since no great amounts of gain are required, instability in the system is not great. With small amounts of gain in the system, the possibility of oscillation of the circuit due to positive signal feedback is also small.

Thus, it is an object of the invention to provide an improved hybrid amplifier.

It is a further object of the invention to provide an improved bidirectional, two-wire amplifier using as the major component only a single difference amplifier for each wire.

It is a still further object of the invention to provide a two-wire bi-directional amplifier with impedance matched networks to provide low gain at the pass band for which signal passage is desired, and cause cancellation of unwanted signals.

It is a still further object to provide an amplification free from oscillation when incorrect terminating impedances are connected to either or both of the two-wire input terminals to the amplifier.

DETAILED DESCRIPTION OF THE DRAWINGS

Figure 1:
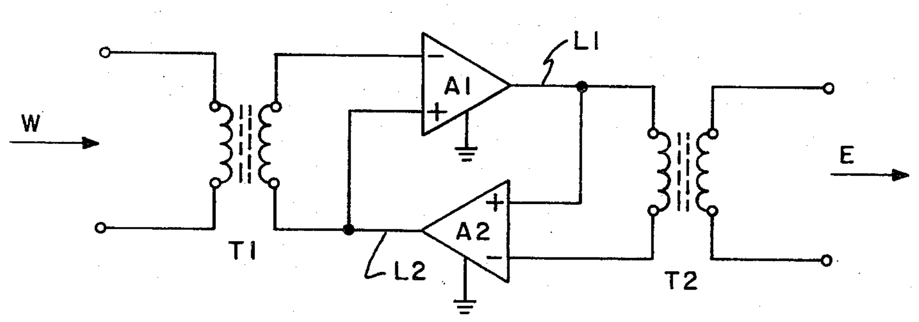
FIG. 1 is a simplified schematic circuit diagram showing a basic concept of my invention.

In FIG. 1, I show a simplified circuit diagram of the basic concept of my invention to produce a bidirectional amplifier. Viewing the West-to-East direction, I show a 1 to 1 or hybrid transformer T1 across the West load. With the load balanced across the transformer primary, signals transmitted from the primary to the secondary of transformer T1 will be inverted relative to one another in the secondary output leads. By applying these signals to the two inputs of a difference amplifier A1, the difference between the signals ($+s$) and ($-s$) will result in a signal of $2s$ intensity at the output of amplifier A1 on lead L1. These signals may be transmitted to transformer T2 to produce an output in the East load.

The signal at L1 is unbalanced and will not be inverted by transformer T2, the transformer merely acting as an inductive load for the signal. Then the signal at L1 on the positive input of A2 and the signal from the transformer secondary winding at the negative input of A2, are in phase. If, by means of circuit components, these signals are arranged to be of the same magnitude, they will be cancelled in amplifier A2 and no signal will pass from L1 to lead L2. For the East-to-West direction of transmission, signals from transformer T2 add in amplifier A2 and reflections are cancelled in amplifier A1. With the small gain requirement of the amplifier as shown, the tendency of the circuit to oscillate due to the polarities of the amplifiers as shown is minimal.

Amplifiers A1 and A2 are difference amplifiers, a difference amplifier being defined as the complement of a summing amplifier to allow the subtraction of two voltages, or as a special case the cancellation of a signal common to the two inputs.

Figure 2:
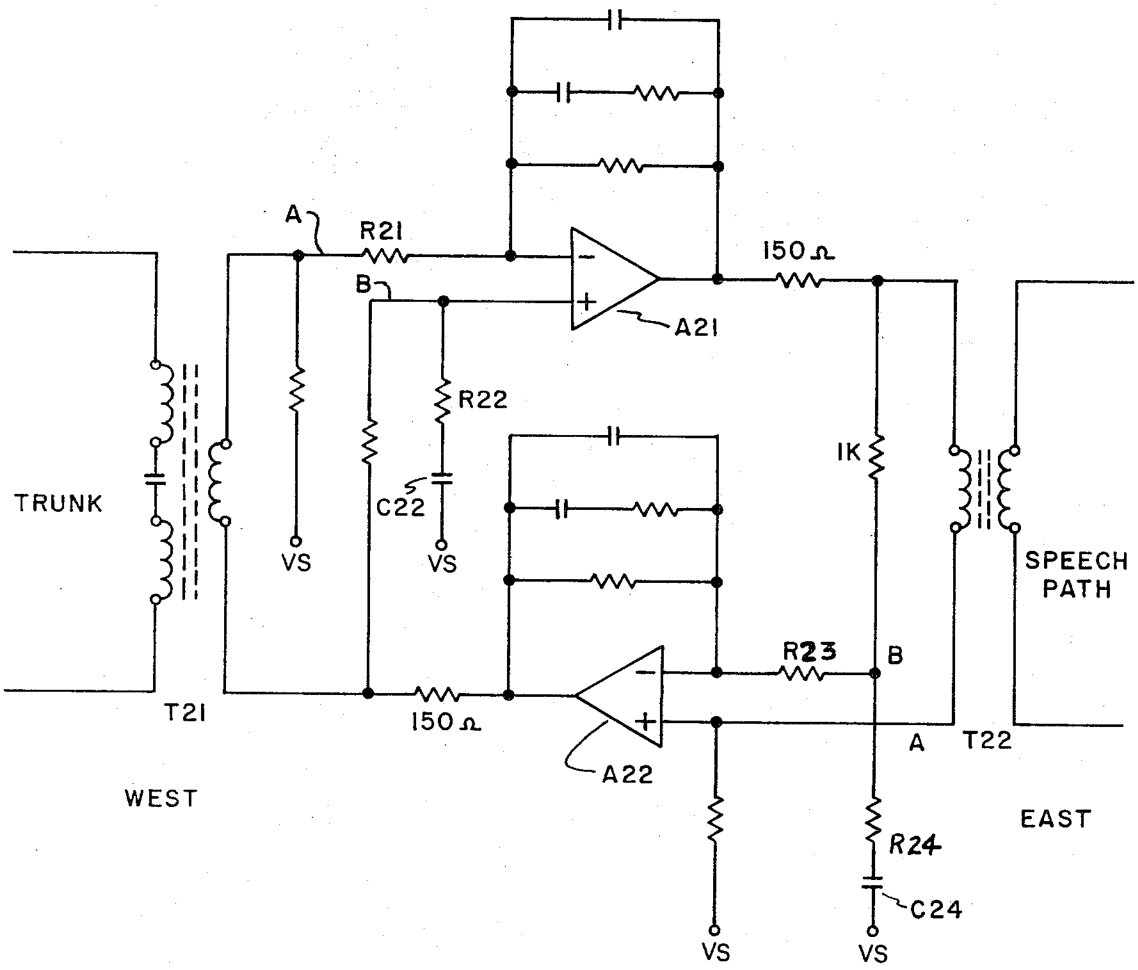
FIG. 2 is a more detailed schematic circuit diagram of one embodiment of my invention.

In FIG. 2, I show an embodiment of my invention with transformers T21 and T22, and amplifiers A21 and A22 similar to those described for FIG. 1. In this embodiment, as can be seen, the principle is identical to that of FIG. 1. Circuit components have been added to provide greater stability for the circuit. Additionally the position of the leads to amplifiers A21 and A22 have been reversed.

Because the coupling transformers T21 and T22 are not ideal, there is an appreciable signal fed to the A inputs of the amplifiers A21 and A22 even when there are no loads present. The signal current flows because of the reactance and can improve the stability during open circuit conditions when the amplifier is stable.

In FIG. 2, I use resistors R21, and R23 for gain control, these being resistors of about 380 ohms and 330 ohms respectively. For balance, I provide resistors R22, and R24, both of 60 ohms.

The addition of two large capacitors, one C22 in series with R22 and the other C24 in series with R24, provides d.c. stability and tends to equalize the signals at the inverting and non-inverting inputs to the amplifiers at low frequencies, reducing the tendency to oscillation.

The capacitors must be selected to provide a compromise between stability and poor return loss. I have found that a value of approximately 56 microfarads seems to be give a good result with the transformer currently used. The amplifier is now completely stable during two port open circuit conditions for the component values selected.

Figure 3:
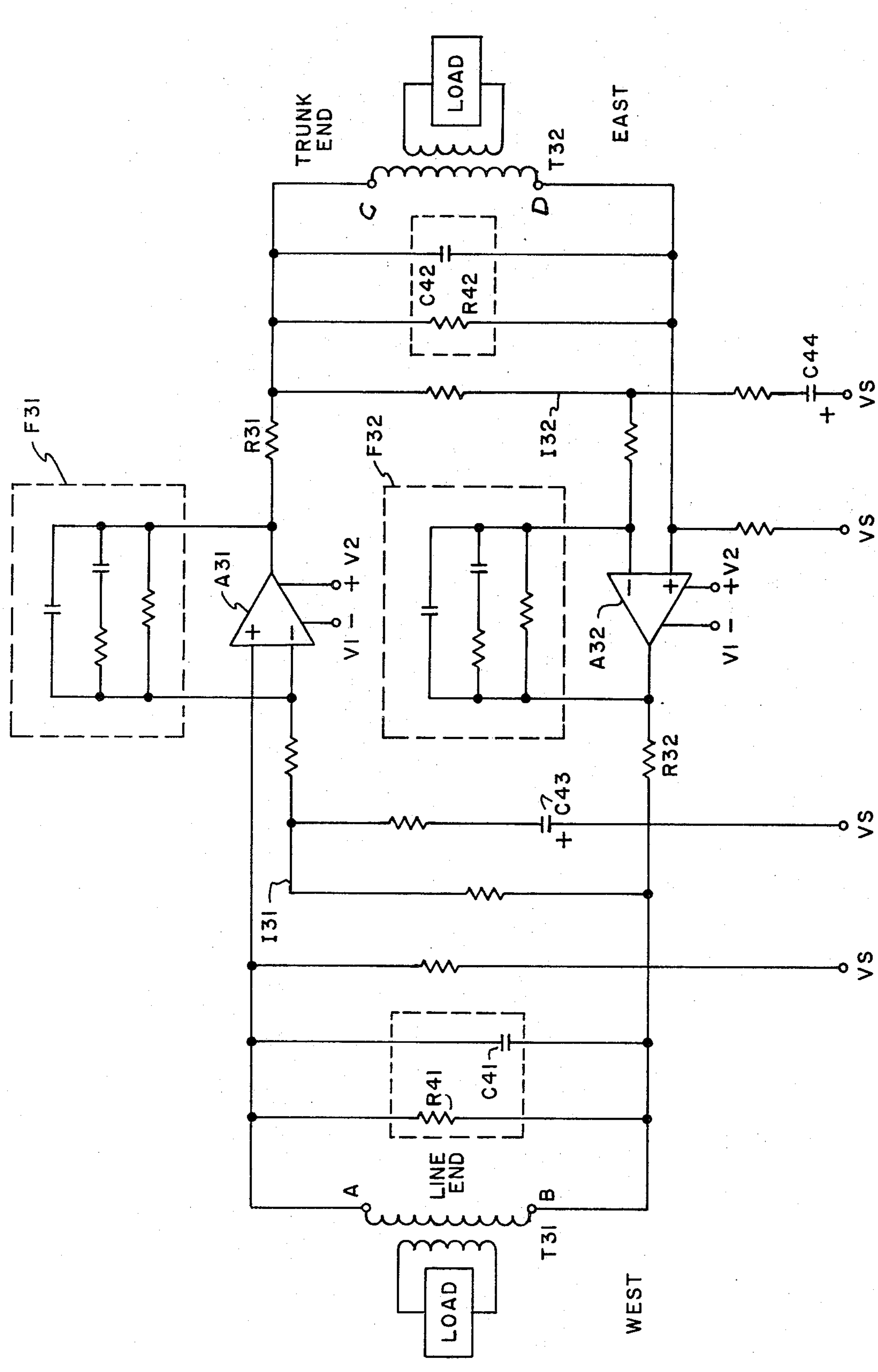
FIG. 3 is a schematic circuit diagram of another embodiment of my invention.

In FIG. 3, I show a slightly revised embodiment of the invention to further increase short circuit stability by biasing the difference amplifiers A31 and A32 so that like polarity inputs (+) are provided as the main input to each amplifier.

In the showing of FIG. 3, I provide a network F31 across amplifier A31 between its negative input and the output, and a like network F32 across amplifier A32 between its negative input and the output, and a like network F32 across amplifier A32 to provide a band pass within a desired band.

In FIG. 3, I show a bidirectional amplifier with a transformer T31 at the West end and a like transformer T32 at the East end. The transformers are one to one as generally known in telephone usage. Connected across the secondary of transformer T31 are the A and B leads each providing a unidirectional path for the flow of signals respectively from and to the transformer T31. The leads C and D respectively across the secondary of transformer T32 provide the opposite end terminations for leads A and B.

In the A-C path is the difference amplifier A31, the A lead forming the positive input and the C lead being the output. Similarly in the DB path is the amplifier A32, its positive input being the D lead and its output being connected to the B lead. Each output path from an amplifier has a resistor, R31 and 32 respectively. The resistances of the two resistors are substantially equal to one another, with the resistance of each being approximately equal to the resistance of the load to balance the line impedance.

Across the transformer secondary for each direction is the parallel combination of resistor R41 and capacitor C41 (West to East) and the combination of resistor R42 and C42 in the East to West direction. These combinations form a filter network to provide an impedance match in order to make the transformer look resistive to signals within the pass band of the filter network.

The negative input to each amplifier A31 and A32 is received over leads 131 and 132 respectively, these paths being resistive feedback paths connected to the terminal of the respective transformer for the reflective signal path for cancellation. The impedance of each negative input path is identical.

As in the prior embodiments, signals received from the West or line end load across transformer T31 are inverted across the transformer. The signals are virtually equal and oppoite in sign when they are fed to the inputs of difference amplifier A31. Within the amplifier the signals are combined, the difference between the signals being essentially twice their amplitude relative to the ground level. To provide this signal level, a voltage of VS is used to bias the amplifier inputs, the voltage being between the amplifier bias levels of −V1 and +V2.

The signal at the output of A31 is unbalanced and will not be inverted by passing through the secondary winding of transformer T32. Thus the signals appearing at the negative and positive inputs of amplifier A32 are of the same phase. Providing circuit values are chosen to make these two signals equal in magnitude they will be cancelled in amplifier A32. Thus no signal will be passed to lead B.

A similar pattern of amplification and cancellation can be followed for the East to West signals received over the secondary of transformer T32.

Relative to this embodiment, it should be noted that the amplifiers A31 and A32 are similarly poled, i.e., positive main input lead and negative feedback lead. Capacitors C43 and C44 provide d.c. stability as mentioned previously and the network T31, R41, C41, C43, and T32, R42, C42. C44 provides open circuit stability and a degree of protection against short circuit instability.

The principal application of the circuit described previously is in 2–4–2 wire amplifiers. However the principle is entirely general and can be applied to a 2–4 wire hybrid circuit having zero insertion loss. The advantages would be in the lack of complexity, low cost and in the ability to use integrated circuit techniques.

Figure 4:
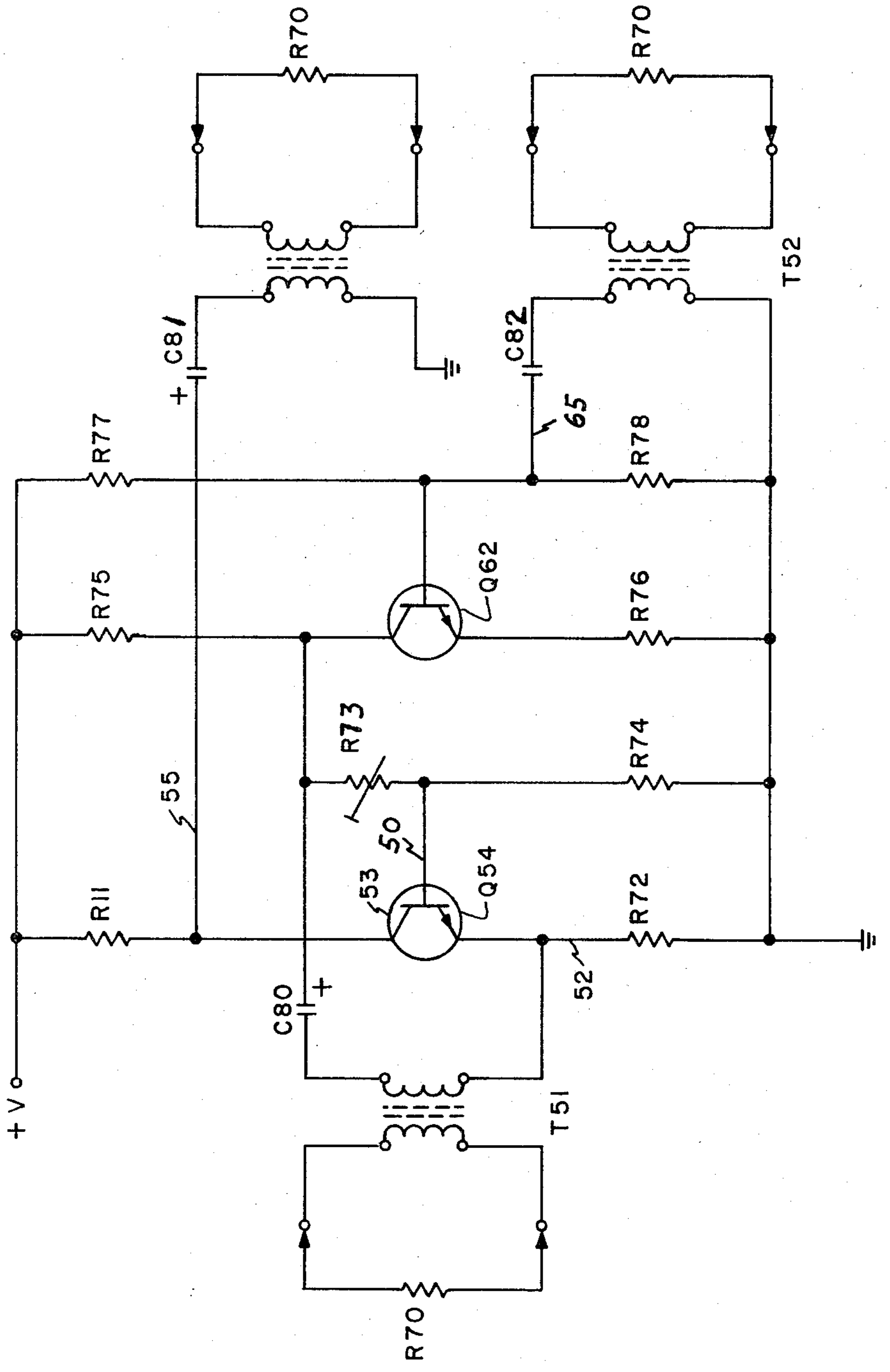
FIG. 4 is a schematic circuit diagram of a two-wire to four-wire converter or electronic hybrid using the basic principle of my invention.

Considering the circuit shown in FIG. 4, AC signals appearing on the two-wire path across the secondary of transistor T51 appear at the base 50 and emitter 56 of transistor Q54 in oppositely phased and are amplified by this transistor. The amplified signals then appear on the outgoing path 55. Because of the high impedance from collector to base of transistor Q62 these signals do not appear on the incoming path 65. AC signals appearing on the incoming path 65 are amplified at the base 63 of transistor Q62 and appear on the two-wire path across the output of transformer T51. In addition, in phase signals appear at the base 50 and emitters 56 of transistor Q54 so no amplification takes place and no signal appears on the outgoing path. Thus 2–4 wire transmission is achieved.

To achieve efficient matching and power transfer the following conditions apply:

$$R70 = R71 = R75 = R77 - R78/R77 + R78;\ R72 << R71\ R73 >> R71$$

To achieve efficient balancing and amplification the following conditions apply:

The ratio of $R75/R76$ has been selected to give unity gain from incoming to two-wire path. $R71/R72$ selected to give unity gain from two-wire to outgoing path, $R73$ is selected to provide a correct balance (2–4 wire path signal rejection) when $R71$ and $R72$ values are fixed for matching and power transfer reasons.

Referring to FIG. 4 in other terms, I show two-wire line across the secondary of transformer T51. The amplifier comprised of transistor Q54 serves to amplify signals from the two-wire line on output lead 55 to the outgoing transformer T53. Incoming signals from transformer T52 are fed to unidirectional amplifier Q62.

AC signals received from the two-wire balanced load and transformer T51 are fed to the base 50 of transistor Q54 through capacitor C80 and resistor R73. Bidirectional signal rejection depends on the precise value of resistor R73, therefore it may be necessary to include a separate capacitor to provide independent d.c. bias conditions. The input signal is also fed to the emitter 56 of NPN transistor Q54, this signal being opposite in phase to the signal fed to base 50 of the transistor. The transistor Q54 conducts and transmits the AC signal on its output lead 55 through capacitor 81 to transformer T53.

The AC signal is also fed to the emitter of transistor Q62 but has no effect, since this transistor remains off. Incoming AC signals received from transformer T52 pass capacitor 82 and are fed to the base of transistor Q62 causing this transistor to turn on. With this transistor in its on condition, signals pass onto lead 85 and to transformer T51. These signals are also fed to the base 50 of transistor Q54 and in phase with that signal are in phase signals on emitter lead 56. Transistor Q54 remains off causing cancellation of signals from lead 55 and no reflected signals may be sent.

It should be noted that values of R70 may be different for each path providing that resistors R71, R75, R77 and R78 are made compatible with the value of R70. In this circuit, the circuit gain must offset the transformer losses and the low frequency reactance of capacitors C80, C81 and C82 which are essentially of equal value.

I claim:

1. A two wire transmission system having individual legs across the output of a transformer coupled to a balanced load, wherein AC signals received across the input of the transformer are inverted relative to one another in the respective legs; the invention comprising a first and a second difference amplifier, each having two input terminals and an output terminal, means coupling one input terminal of said first amplifier to one output leg of said transformer to receive signals therefrom, means coupling the other input terminal of said first amplifier to the other output leg of said transformer to receive inverted signals therefrom whereby to algebraically subtract in said first amplifier signals received from said transformer, and said second difference amplifier in said second leg with its output terminal coupled to the other leg of said transformer; the input terminals of said second amplifier coupled to the output of said first amplifier to attenuate signals reflected from the output of said first amplifier.

2. A two-wire transmission system as claimed in claim 1, wherein said first and second amplifiers comprise unidirectional circuits, and in which there are means biasing said circuits to provide the unidirectional bias.

3. A system as claimed in claim 2, wherein there are means biasing said difference amplifiers to unconditional stability during changes in impedance within the transmission system.

4. A transmission system as claimed in claim 1 wherein there is an impedance across the inputs to said second amplifier.

5. A bidirectional two-wire hybrid comprising a first and a second transformer across the respective inputs to said hybrid, each of said transformers having the input thereof balanced relative to ground, a first and a second path coupling the outputs of said transformers to one another, a first and a second operational amplifier each having two inputs, each amplifier being of the type which algebraically subtracts signals received over its two inputs, the inputs of said first amplifier being coupled across the outputs of said first transformer and the inputs of said second amplifier being coupled across the output of said second transformer, the output of said first transformer coupled to a said second transformer and comprising said first path, and the output of said second transformer being coupled to an output lead of said first transformer and comprising said second path, whereby signals received by either transformer are inverted relative to one another in the paths for amplification in the respective amplifiers, and reflected signals are attenuated within the respective amplifiers.

6. A hybrid circuit as claimed in claim 5, wherein said first amplifier comprises a transistor having an emitter terminal and a base terminal, with the output legs from said transformer coupled to the base and emitter of said transistor.

7. A hybrid circuit as claimed in claim 6, wherein said second amplifier comprises a transistor, having an emitter terminal and a base terminal and said other input circuit to said first amplifier transistor is connected to the base terminal of said second transistor, and the collector of said second transistor is connected to the base terminal of said first transistor.

* * * * *